(12) United States Patent
Wang

(10) Patent No.: US 7,800,793 B2
(45) Date of Patent: *Sep. 21, 2010

(54) SCANNING SPEED CONTROL DEVICE AND METHOD

(76) Inventor: Kuo-Jeng Wang, No. 14, Kuang-An St., Fong-Kuang Li, Hsiao-Kang District, Kaohsiung (TW)

( * ) Notice: Subject to any disclaimer, the term of this patent is extended or adjusted under 35 U.S.C. 154(b) by 210 days.

This patent is subject to a terminal disclaimer.

(21) Appl. No.: 11/512,510

(22) Filed: Aug. 29, 2006

(65) Prior Publication Data

US 2006/0291010 A1 Dec. 28, 2006

Related U.S. Application Data

(63) Continuation of application No. 09/920,387, filed on Jul. 31, 2001, now Pat. No. 7,248,387.

(51) Int. Cl.
*H04N 1/04* (2006.01)
(52) U.S. Cl. ........................ 358/474; 358/486; 358/1.17; 358/426.05; 358/1.15; 382/317; 382/305; 347/247; 347/237
(58) Field of Classification Search .................. 358/474, 358/505, 501, 444, 402, 412, 500, 1.15, 1.9, 358/1.16, 1.17, 523, 524, 426.05, 426.02, 358/486; 382/312, 313, 317, 305; 347/247, 347/237, 248
See application file for complete search history.

(56) References Cited

U.S. PATENT DOCUMENTS

| | | | |
|---|---|---|---|
| 4,169,273 A * | 9/1979 | Hendrickson | ................ 348/311 |
| 4,169,275 A * | 9/1979 | Gunning | ..................... 358/300 |
| 4,638,156 A | 1/1987 | Horikawa et al. | |
| 4,700,066 A | 10/1987 | Horikawa | |
| 4,748,514 A * | 5/1988 | Bell | ........................... 358/486 |
| 5,018,716 A | 5/1991 | Yoshida et al. | |
| 5,289,000 A | 2/1994 | Toyofuku | |
| 5,381,020 A | 1/1995 | Kochis et al. | |
| 5,517,331 A | 5/1996 | Murai et al. | |
| 5,805,312 A | 9/1998 | Ozawa et al. | |
| 5,943,139 A | 8/1999 | Tang et al. | |
| 6,115,149 A | 9/2000 | Lai et al. | |
| 6,147,776 A | 11/2000 | Sakurai et al. | |
| 6,160,636 A | 12/2000 | Nagano et al. | |
| 6,262,816 B1 | 7/2001 | Rindsig et al. | |
| 6,335,807 B1 | 1/2002 | Neale et al. | |
| 6,459,506 B1 * | 10/2002 | Hu et al. | ..................... 358/473 |
| 6,490,057 B1 * | 12/2002 | Sakaguchi | ................... 358/412 |
| 6,515,774 B2 | 2/2003 | Horiuchi et al. | |
| 6,525,843 B1 | 2/2003 | Yu | |
| 6,661,541 B1 | 12/2003 | Chang | |
| 7,248,387 B2 * | 7/2007 | Wang | ......................... 358/474 |
| 2001/0035985 A1 | 11/2001 | Takahashi et al. | |
| 2004/0252323 A1 * | 12/2004 | Mimamino | ................ 358/1.14 |
| 2005/0162715 A1 * | 7/2005 | Murata | ........................ 358/474 |
| 2006/0290996 A1 * | 12/2006 | Nishida et al. | ............. 358/305 |
| 2006/0290998 A1 * | 12/2006 | Jung et al. | ............ 358/426.03 |

\* cited by examiner

*Primary Examiner*—Negussie Worku
(74) *Attorney, Agent, or Firm*—Stolowitz Ford Cowger LLP

(57) ABSTRACT

A control device and a method for controlling scanning speed of a scanner. The control device includes a decision device and a driving device. The decision device further includes an image buffer, an up-down counter and a comparator. The decision device receives the input image data and utilizes the up-down counter to compute data access volume inside the image buffer. The comparator decides whether to increase or decrease the scanning speed according to the data access volume and also outputs decision data to the driving device.

20 Claims, 2 Drawing Sheets

SCANNING SPEED CONTROL DEVICE AND METHOD

CROSS-REFERENCE TO RELATED APPLICATIONS

The present application is a continuation of U.S. application Ser. No. 09/920,387, filed Jul. 31, 2001 now U.S. Pat. No. 7,248,387. The entire disclosure of prior application Ser. No. 09/920,387 is considered as being part of the disclosure of the present application and is hereby incorporated by reference herein in its entirety.

BACKGROUND OF THE INVENTION

1. Field of Invention

The present invention relates to a scanning control device and a scanning speed control method. More particularly, the present invention relates to a scanning speed control device and a scanning speed control method.

2. Description of Related Art

Due to rapid progress in office equipment technologies, various types of complementary systems including the auto-document feeder (ADF) are developed. An auto-document feeder (ADF) can be applied to different types of machines such as a printer, a photocopier or a scanner so that paper is fed into the machine without manual labor. If the auto-feeder contains papers, the processor unit (a processor or an application specific integrated circuit) inside the machine detects the presence of papers through sensors. When a machine having an auto-feeder needs paper, paper is automatically fed into the machine according to controlling signal produced by the processor unit. Thus, auto-feeder facilitates the operation of most machines. However, when an auto-feeder is applied to a scanner, due to special design condition of the mechanism used by the auto-feeder, forward and backward scanning by the scanner is restricted.

SUMMARY OF THE INVENTION

Accordingly, one object of the present invention is to provide scanning speed control device that controls the running speed of a motor and reduces probability of moving forward and backward without sacrificing scanning speed. An up-down counter is used to record current transaction volume of an image buffer so that an appropriate scanning speed can be set to optimize the scanning speed.

To achieve these and other advantages and in accordance with the purpose of the invention as embodied and broadly described herein, the invention provides a control device for controlling the scanning speed of a scanner. The control device includes a decision device, a driving device and an input/output interface. The decision device receives input image data and transmits decision data and output image data. The driving device receives decision data and the input/output interface receives the output image data.

The decision device of this invention controls the scanning speed. The decision device includes an image buffer, an up-down counter and a comparator. The image buffer receives the input image data, stores the data temporarily in a register and finally transmits output image data. The up-down counter computes and records amount of data accessed through the image buffer, and then outputs count data. The comparator receives the count data and decides to increase or decrease current scanning speed according to the count data and finally outputs the decision data.

This invention also provides a method of controlling scanning speed of a scanner. First, count data and the largest data access volume are provided. According to a ratio between the count data and the largest data access volume, the scanning speed of the scanner is set.

In brief, utilizing the data access volume of the image buffer and the count data to the comparator, the comparator can determine if a paper is in the initial feed state, the intermediate state or the terminal-scanning state so that a different scanning speed appropriate to the particular state is employed.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
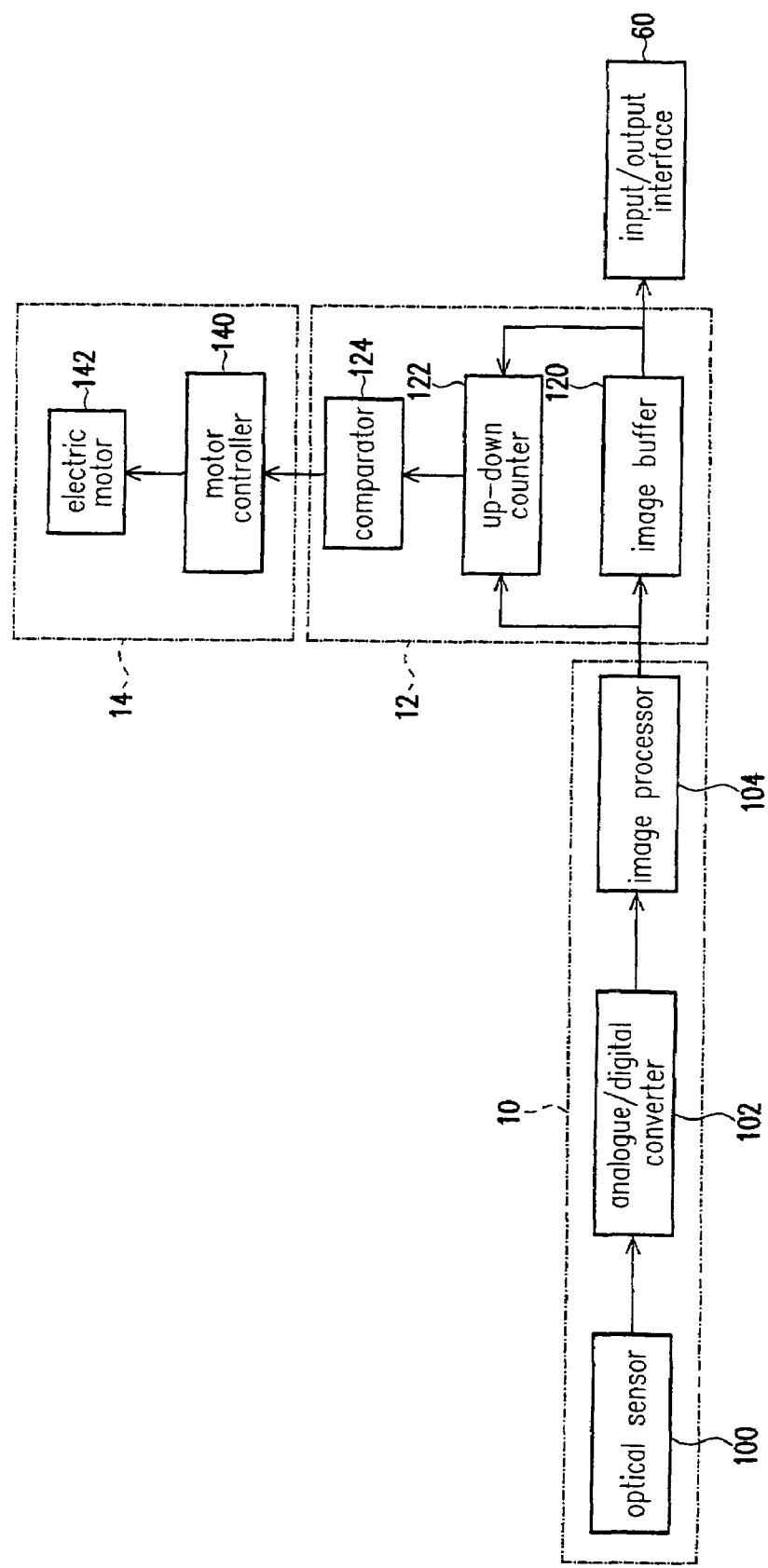
FIG. 1 is a schematic block diagram showing a scanning speed control device according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram showing a scanning speed control device according to one preferred embodiment of this invention. As shown in FIG. 1, the control device includes an input device 10, a decision device 12, a driving device 14 and an input/output interface 16. The input device 10 further includes an optical sensor 100, an analogue/digital converter 102 and an image processor 104. The decision device 12 further includes an image buffer 120, a counter 122 and a comparator 124. The driving device 14 further includes a motor controller 140 and an electric motor 142.

The analogue/digital converter 102 couples with the optical sensor 100. The image processor 104 couples with the analogue/digital converter 102 and the image buffer 120. The image buffer 120 couples with the input/output interface 16. The up-down counter 122 couples with the input terminal of the image buffer 120 and the output terminal of the image buffer 120. The comparator 124 couples with the up-down counter 122 and the motor controller 140. The motor controller 140 couples with the electric motor 142.

To conduct a scanning operation, the optical sensor 100 utilizes a charge coupled device (CCD) to detect any external signal. Each CCD cell converts the intensity of light into an electrical current. The electric current transforms into signal charges and finally appears as a voltage potential. Eventually an analogue signal is produced. The analogue signal is output from the optical sensor 100 to the analogue/digital converter 102. As soon as the analogue/digital converter 102 receives the analogue signal, the analogue signal is converted to a digital signal and the digital signal is immediately transferred to the image processor 104. Inside the image processor 104, the digital signal is processed and converted into input image data. The input image data is transferred to the image buffer 120 and the up-down counter 122.

When the image buffer 120 receives the input image data, the input image data is temporarily stored. After complete processing of the input image data inside the image buffer 120, the input image data is converted to output image data and then the output image data is transferred to the input/output interface 16 and the up-down counter 122.

When the image processor 104 outputs input image data to the image buffer 120, the up-down counter 122 enables its up-counting function so that one is added to the value inside the counter 122. Similarly, when the up-down counter senses the transfer of an output image data to the input/output interface 16, the up-down counter 122 enable its down-counting function so that one is deducted from the value inside the counter 122. After updating the count data within the up-down counter 122, the count data is transmitted to the comparator 124. In this embodiment, only one type of counting method is illustrated. Obviously, other types of counting methods are available for selection. The up-down counter 122 is a device for computing and recording data access volume of the image buffer 120 and outputting count data to the comparator 124.

The comparator 124 decides to increase or slow down the scanning speed according to the received count data and outputs decision data to the motor controller 140. The motor controller 140 controls the running speed of the electric motor 142 according to the decision data. For example, if the amount of count data in the image buffer 120 drops, this indicates the scanning is near completion. The comparator 124 informs the motor controller 140, via the decision data, to slow down the electric motor 142.

The comparator in FIG. 1 indicates the need for a method for deciding whether to increase or decrease the scanning speed of a scanner. The following is an illustration of such a decision method.

Figure 2:
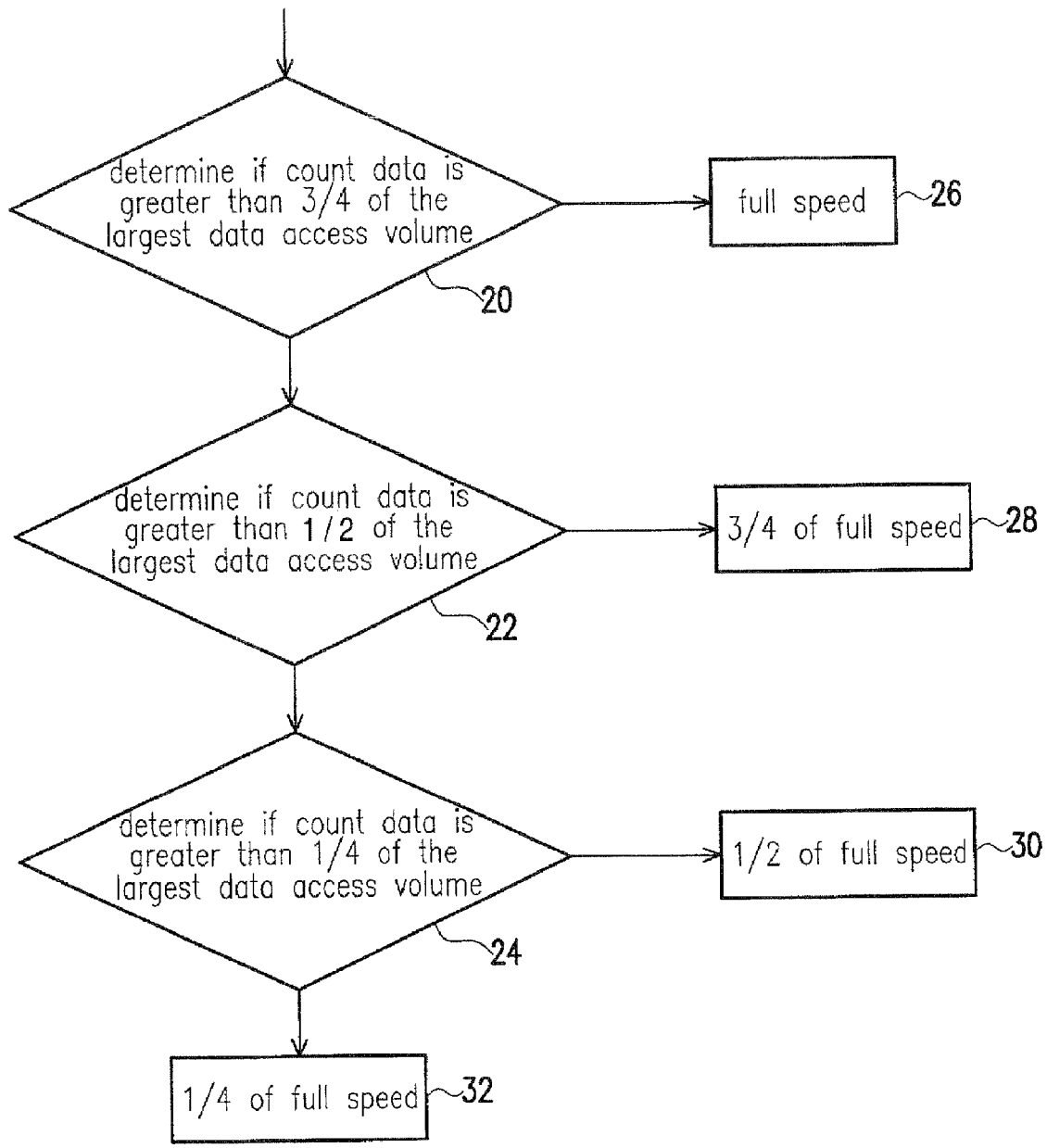
FIG. 2 is a flow diagram showing the method of controlling the scanning speed of a scanner according to one preferred embodiment of this invention.

FIG. 2 is a flow diagram showing the method of controlling the scanning speed of a scanner according to one preferred embodiment of this invention. First, count data and the largest data access volume is provided. According to a ratio of the count data over the largest data access volume, a scanning speed is set. Thereafter, as shown in FIG. 2, step 20 is executed so that whether the count data is greater than ¾ of the largest data access volume is checked. If the count data is greater than ¾ of the largest data access volume, step 26 is executed so that the scanning speed is adjusted to full speed. On the other hand, if the count data is smaller than ¾ of the largest data access volume, step 22 is executed to determine if the count data is greater or smaller than ½ of the largest data access volume. If the count data is greater than ½ of the largest data access-volume, step 28 is executed such that the scanning speed is set to ¾ of the full speed. On the other hand, if the count data is smaller than ½ of the largest data access volume, step 24 is executed to determine if the count data is greater or smaller than ¼ of the largest data access volume. If the count data is greater than ¼ of the largest data access volume, step 30 is executed such that the scanning speed is set to ½ of the full speed. On the other hand, if the count data is smaller than ¼ of the largest data access volume, step 32 is executed such that the scanning speed is set to ¼ of the full speed. In practice, anybody familiar with such technique is free to decide the relationship between the scanning speed of the scanner and the data count/largest data access volume ratio.

In conclusion, one major advantage of this invention is the variation of scanning speed according to the stored data inside the image buffer so that an optimal scanning speed can be maintained even if forward/backward scanning is restricted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus, comprising:
an input device configured to generate image data according to selected scanning parameters;
an image buffer having a data storage capacity and configured to buffer the image data generated according to the selected scanning parameters;
a processing circuit configured to identify an approximate amount of the image data for buffering in the image buffer, and select between multiple different fixed predetermined scanning speeds for performing scanning operations according to the approximate amount of the image data and the data storage capacity of the image buffer; and
a driving device configured to move the input device at one of the multiple different fixed predetermined scanning speeds selected by the processing circuit.

2. The apparatus of claim 1, wherein the processing circuit is further configured to:
identify a ratio between the approximate amount of the image data and the data storage capacity of the image buffer;
select a first one of the multiple different fixed predetermined scanning speeds when the ratio is equal to or above a first predetermined threshold; and
select a second one of the multiple different fixed predetermined scanning speeds when the ratio is below the first predetermined threshold.

3. The apparatus of claim 2, wherein the processing circuit is further configured to:
select the second one of the multiple different fixed predetermined scanning speeds when the ratio is below the first predetermined threshold and greater than a second predetermined threshold; and
select a third one of the multiple different fixed predetermined scanning speeds when the ratio is below the second predetermined threshold.

4. The apparatus of claim 1, wherein the processing circuit is further configured to:
select a first one of the multiple different fixed predetermined scanning speeds for all identified amounts of the image data within a first predetermined size range; and
select a second one of the multiple different fixed predetermined scanning speeds for all identified amounts of the image data within a second predetermined size range outside of the first predetermined size range.

5. The apparatus of claim 1, wherein the processing circuit is further configured to:
identify different predetermined ranges for a ratio between the approximate amount of the image data and the data storage capacity of the image buffer;
associate the multiple different fixed predetermined scanning speeds with the different predetermined ranges;
receive an input corresponding with the approximate amount of the image data;

identify a particular one of the different predetermined ranges corresponding with the input; and select one of the multiple different fixed predetermined scanning speeds associated with the particular one of the different predetermined ranges.

6. The apparatus of claim 1, wherein the processing circuit is further configured to:

predict an amount of remaining scanning to be completed according to an amount of available data storage capacity in the image buffer; and select one of the multiple different fixed predetermined scanning speeds corresponding with the amount of remaining scanning to be completed.

7. An apparatus, comprising:

logic circuitry configured to:

receive an input corresponding with an amount of image data associated with a scanning operation;

identify a data storage capacity for a buffer used for buffering the image data; and select one of multiple different discrete substantially constant predetermined scanning speeds for performing the scanning operation according to the amount of image data associated with the scanning operation and the data storage capacity identified for the buffer.

8. The method of claim 7, wherein the logic circuitry is further configured to:

select a first one of the multiple different discrete substantially constant predetermined scanning speeds for performing the scanning operation when the amount of image data is equal to or above a threshold; and select a second one of the multiple different discrete substantially constant predetermined scanning speeds for performing the scanning operation when the amount of image data is below the threshold.

9. The apparatus of claim 7, wherein the logic circuitry is further configured to:

identify a ratio between the amount of image data and the data storage capacity identified for the buffer;

select a first one of the multiple different discrete substantially constant predetermined scanning speeds for performing the scanning operation when the ratio is within a first range; and select a second one of the multiple different discrete substantially constant predetermined scanning speeds for performing the scanning operation when the ratio is within a second range.

10. An apparatus, comprising:

means for receiving input image data from an input device and for outputting decision data based at least in part on count data or data access volume, or combinations thereof;

means for using the decision data to determine an intermediate scanning phase or an ending scanning phase for a document associated with the input image data; and means for receiving the decision data and for adjusting a scanning speed according to the decision data, wherein said means for receiving the decision data and for adjusting a scanning speed is coupled to said means for receiving input image data, and wherein the scanning speed is increased when the decision data indicates the document is in the intermediate scanning phase and the scanning speed is decreased when the decision data indicates the document is in the ending scanning phase.

11. The apparatus of claim 10, further comprising:

means for counting data access volume inside an image buffer and outputting the count data, wherein said means for counting the data access volume inside an image buffer and outputting the count data is coupled to an input terminal of the image buffer and coupled to an output terminal of the image buffer.

12. The apparatus of claim 10, further comprising:

means for updating the count data if transfer of the input image data into an image buffer is detected; and means for updating the count data if transfer of output image data to an input/output interface is detected.

13. A scanner, comprising:

logic circuitry configured to:

load scanned image data into an image buffer;

monitor a volume of image data in the image buffer to determine a feed state of data scanning;

determine a particular one of an initial feed state, intermediate feed state, and terminal feed state of the data scanning according to the volume of image data in the image buffer; and vary a scanning speed according to the particular one of the initial feed state, intermediate feed state, and terminal feed state of the data scanning.

14. The scanner according to claim 13, wherein the logic circuitry is further configured to increase the scanning speed when the data scanning is determined to be in the intermediate feed state and decrease the scanning speed when the data scanning is determined to be in the terminal feed state.

15. A scanner, comprising:

an input device configured to load scanned image data into an image buffer; and a processing device configured to:

monitor a volume of image data in the image buffer to determine a feed state of the data scanning;

determine one of an intermediate feed state or terminal feed state of the data scanning; and increase a scanning speed when the data scanning is determined to be in the intermediate feed state and decreasing the scanning speed when the data scanning is determined to be in the terminal feed state.

16. The scanner according to claim 15, wherein the processing device is further configured to:

determine a particular one of an initial feed state, the intermediate feed state, and the terminal feed state of the data scanning according to the volume of image data in the image buffer; and vary the scanning speed according to the particular one of the initial feed state, the intermediate feed state, and the terminal feed state of the data scanning.

17. An apparatus, comprising:

an optical sensor configured to conduct a scanning operation that generates image data;

an image buffer configured to buffer the image data generated from the scanning operation; and a logic circuit configured to:

identify an amount of image data expected to be produced by the scanning operation according to a received input, identify a selected one of multiple constant predetermined scanning speeds for conducting the scanning operation, the selected one of the multiple constant predetermined scanning speeds corresponding with the amount of image data expected to be produced by the scanning operation, and direct a driving device to move the optical sensor at the selected one of the multiple constant predetermined scanning speeds.

18. The apparatus according to claim 17, wherein the logic circuit is further configured to:
  identify a size ratio between the amount of image data and a data storage capacity of the image buffer;
  select a first one of the multiple constant predetermined scanning speeds when the size ratio is above a threshold; and
  select a second one of the multiple constant predetermined scanning speeds when the size ratio is below the threshold.

19. The apparatus according to claim 17, wherein the logic circuit is further configured to:
  select a first one of the multiple constant predetermined scanning speeds when the amount of image data is within a first size range; and
  select a second one of the multiple constant predetermined scanning speeds when the amount of image data is within a second size range outside of the first size range.

20. The apparatus of claim 17, wherein the logic circuit is further configured to:
  predict an amount of scanning remaining to be completed according to an amount of available storage capacity in the image buffer, and
  select one of the multiple constant predetermined scanning speeds corresponding with the amount of scanning remaining to be completed.

* * * * *

UNITED STATES PATENT AND TRADEMARK OFFICE
CERTIFICATE OF CORRECTION

| | | |
|---|---|---|
| PATENT NO. | : 7,800,793 B2 | Page 1 of 1 |
| APPLICATION NO. | : 11/512510 | |
| DATED | : September 21, 2010 | |
| INVENTOR(S) | : Wang | |

It is certified that error appears in the above-identified patent and that said Letters Patent is hereby corrected as shown below:

Title page, item (45), under "Date of Patent", in Column 2, Line 1, delete "*Sep. 21, 2010" and insert -- Sep. 21, 2010 --.

Title page, below item (76), under "Notice", in Column 1, Lines 4-5, below "210 days." delete "This patent is subject to a terminal disclaimer".

Column 5, line 25, in Claim 8, delete "The method of" and insert -- The apparatus of --.

Column 5, line 65, in Claim 11, delete "counting data access" and insert -- counting the data access --.

Column 6, line 32, in Claim 15, delete "state of the data" and insert -- state of data --.

Column 6, line 36, in Claim 15, delete "and decreasing" and insert -- and decrease --.

Column 6, line 58, in Claim 17, delete "input," and insert -- input; --.

Column 6, line 64, in Claim 17, delete "operation, and" and insert -- operation; and --.

Column 8, line 9, in Claim 20, delete "buffer, and" and insert -- buffer; and --.

Signed and Sealed this
Third Day of July, 2012

David J. Kappos
*Director of the United States Patent and Trademark Office*